(12) United States Patent
Kim et al.

(10) Patent No.: US 10,262,795 B2
(45) Date of Patent: Apr. 16, 2019

(54) MULTILAYER CERAMIC ELECTRONIC COMPONENT INCLUDING CERAMIC-METAL COMPOUND LAYERS

(71) Applicant: SAMSUNG ELECTRO-MECHANICS CO., LTD., Suwon-si, Gyeonggi-do (KR)

(72) Inventors: Hong Seok Kim, Suwon-si (KR); Chung Eun Lee, Suwon-si (KR); Doo Young Kim, Suwon-si (KR); Ki Han Kim, Suwon-si (KR); Ji Ye Choi, Suwon-si (KR); Kyung Ryul Lee, Suwon-si (KR); Jae Yeol Choi, Suwon-si (KR); Soo Kyong Jo, Suwon-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 114 days.

(21) Appl. No.: 15/071,821

(22) Filed: Mar. 16, 2016

(65) Prior Publication Data
US 2017/0011850 A1 Jan. 12, 2017

(30) Foreign Application Priority Data

Jul. 6, 2015 (KR) .......................... 10-2015-0095991

(51) Int. Cl.
*H01G 4/08* (2006.01)
*H01G 4/30* (2006.01)
(Continued)

(52) U.S. Cl.
CPC ............... *H01G 4/08* (2013.01); *H01G 4/012* (2013.01); *H01G 4/248* (2013.01); *H01G 4/30* (2013.01)

(58) Field of Classification Search
CPC ............ H01G 4/08; H01G 4/012; H01G 4/30; H01G 4/248
See application file for complete search history.

(56) References Cited

U.S. PATENT DOCUMENTS

| 4,875,136 A | * | 10/1989 | Sano | H01G 4/1272 29/25.42 |
| 5,072,329 A | * | 12/1991 | Galvagni | H01G 4/30 29/25.42 |
| 2006/0023399 A1 | | 2/2006 | Fujioka et al. | |
| 2006/0039097 A1 | * | 2/2006 | Satou | H01G 4/01 361/303 |

(Continued)

FOREIGN PATENT DOCUMENTS

| CN | 1728303 A | 2/2006 |
| CN | 102906835 A | 1/2013 |

(Continued)

OTHER PUBLICATIONS

First Office Action issued in Chinese Patent Application No. 201610185907.9, dated Jun. 21, 2018 (English translation).

*Primary Examiner* — David M Sinclair
(74) *Attorney, Agent, or Firm* — Morgan Lewis & Bockius LLP

(57) ABSTRACT

A multilayer ceramic electronic component includes a ceramic body in which dielectric layers and internal electrodes are alternately disposed. Ceramic-metal compound layers are disposed on interfaces between the internal electrodes and the dielectric layers. Additionally, in some examples, spaces between adjacent internal electrodes are fully occupied by the dielectric layers and the dielectric layers contain a ceramic-metal compound containing metal particle. The ceramic-metal compound layer may have an embossing type configuration or a dendrite type configuration.

20 Claims, 5 Drawing Sheets

(51) Int. Cl.
*H01G 4/248* (2006.01)
*H01G 4/012* (2006.01)

(56) References Cited

U.S. PATENT DOCUMENTS

| | | | | |
|---|---|---|---|---|
| 2006/0208575 A1* | 9/2006 | Orimo | ............... | H01G 4/0085 307/109 |
| 2007/0076347 A1* | 4/2007 | Togashi | ............... | H01G 4/012 361/303 |
| 2011/0310528 A1* | 12/2011 | Chai | ............... | H01G 4/005 361/321.1 |
| 2012/0262836 A1* | 10/2012 | Chai | ............... | H01G 4/30 361/301.4 |
| 2012/0268861 A1* | 10/2012 | Lee | ............... | C04B 37/026 361/321.2 |
| 2014/0240898 A1 | 8/2014 | Kim et al. | | |
| 2015/0332852 A1* | 11/2015 | Kim | ............... | H05K 1/181 174/260 |
| 2016/0194504 A1* | 7/2016 | Ishikawa | ............... | C08L 1/14 427/58 |

FOREIGN PATENT DOCUMENTS

| | | | | | |
|---|---|---|---|---|---|
| CN | 104021937 A | | 9/2014 | | |
| JP | 05190373 A | * | 7/1993 | | |
| JP | 2000-106035 A | | 4/2000 | | |
| JP | 2004-006909 A | | 1/2004 | | |
| JP | 2013-157460 A | | 8/2013 | | |
| JP | 2013149855 A | * | 8/2013 | | |
| JP | WO 2015040916 A1 | * | 3/2015 | ............... | C08L 1/14 |
| WO | 2011/084502 A2 | | 7/2011 | | |

\* cited by examiner

MULTILAYER CERAMIC ELECTRONIC COMPONENT INCLUDING CERAMIC-METAL COMPOUND LAYERS

CROSS-REFERENCE TO RELATED APPLICATION

This application claims the priority and benefit of Korean Patent Application No. 10-2015-0095991, filed on Jul. 6, 2015 with the Korean Intellectual Property Office, the disclosure of which is incorporated herein by reference.

BACKGROUND

The present disclosure relates to a multilayer ceramic electronic component having high permittivity and excellent reliability.

In general, electronic components using a ceramic material, such as capacitors, inductors, piezoelectric elements, varistors, thermistors, or the like, include a ceramic body formed of a ceramic material, internal electrodes formed in the ceramic body, and external electrodes installed on a surface of the ceramic body so as to be connected to the internal electrodes.

As these electronic components including ceramic materials are increasingly used in fields requiring high reliability, demand for high reliability multilayer ceramic electronic components has increased.

In addition, recently, a thin multilayer ceramic electronic component has been mass-produced, and demand for a super capacitance multilayer ceramic electronic component has increased.

Up until now, electrical properties and permittivity of a multilayer ceramic capacitor have been improved mainly by changing a composition of the dielectric material, changing a thickness of a dielectric layer, and changing a shape of an internal electrode pattern.

In addition to a method for improving the electrical properties and permittivity as described above, a method for further improving the electrical properties and permittivity of electronic components is also needed.

SUMMARY

An aspect of the present disclosure may provide a multilayer ceramic electronic component having high permittivity and excellent reliability.

According to an aspect of the present disclosure, a multilayer ceramic electronic component includes a ceramic body in which dielectric layers and internal electrodes are alternately disposed. Additionally, ceramic-metal compound layers are disposed on interfaces between the internal electrodes and the dielectric layers.

According to another aspect of the present disclosure, a multilayer ceramic electronic component includes a ceramic body in which dielectric layers and internal electrodes are alternately disposed. Spaces between adjacent internal electrodes are fully occupied by the dielectric layers containing a ceramic-metal compound containing metal particles, and by ceramic-metal compound layers disposed on interfaces between the internal electrodes and the dielectric layers. Metal nano-particles are disposed in central portions of the dielectric layers.

According to a further aspect of the present disclosure, a multilayer ceramic electronic component includes a plurality of internal electrodes disposed parallel to each other and spaced apart from each other within the multilayer ceramic electronic component. The internal electrodes each have ceramic-metal compound layers disposed on two opposing surfaces thereof.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
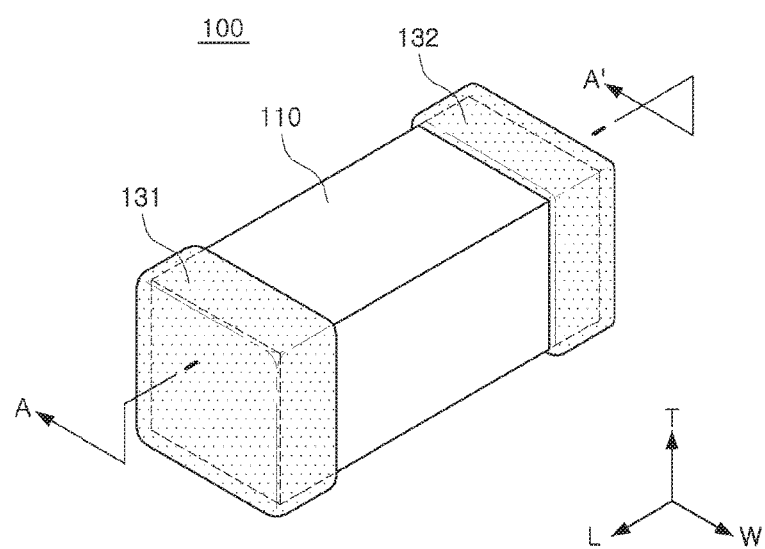
FIG. 1 is a perspective view illustrating a multilayer ceramic electronic component according to an exemplary embodiment.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to one or more other element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the devices in the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, members, elements, and/or groups, but do not preclude the presence or addition of one or more other features, integers, steps, operations, members, elements, and/or groups.

Hereinafter, embodiments of the present inventive concept will be described with reference to schematic views illustrating embodiments of the present inventive concept. In the drawings, for example, ideal shapes of components are shown. However, due to manufacturing techniques and/or tolerances, components may be manufactured having modified shapes relative to those shown. Thus, embodiments of the present inventive concept should not be construed as being limited to the particular shapes of regions shown herein, but should more generally be interpreted as including changes in shape resulting from manufacturing processes and non-idealities. The inventive concepts may also be constituted by one or a combination of various embodiments shown and/or described herein.

The contents of the present inventive concept described below may have a variety of configurations. Only illustrative configurations are shown and described herein, but the inventive concept is not limited thereto and should be interpreted as extending to all appropriate configurations.

Multilayer Ceramic Electronic Component

Figure 2:
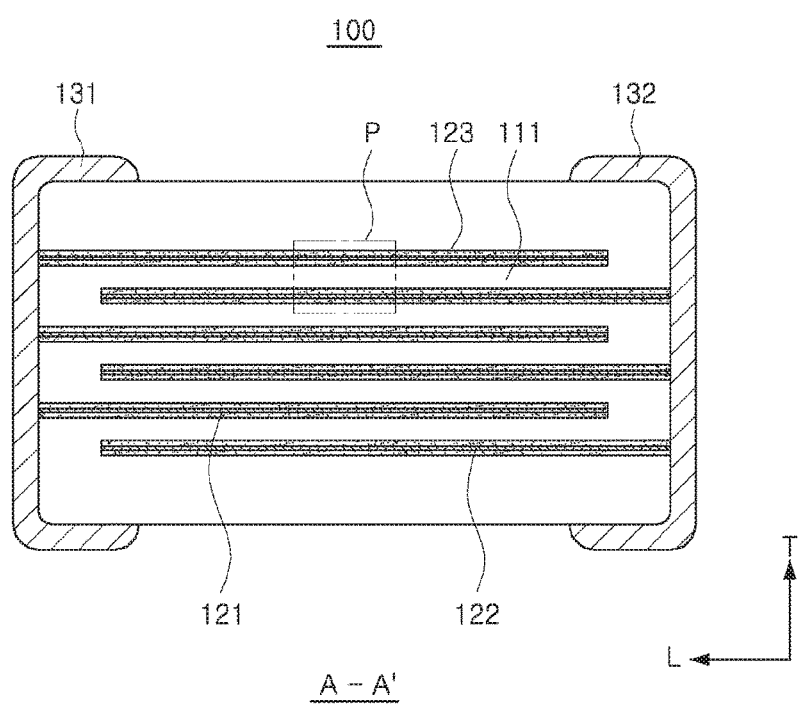
FIG. 2 is a cross-sectional view taken along line A-A' of FIG. 1 according to one illustrative embodiment.

FIG. 1 is a perspective view schematically illustrating a multilayer ceramic electronic component according to an exemplary embodiment, and FIG. 2 is a cross-sectional view taken along line A-A' of FIG. 1 according to one illustrative embodiment.

Referring to FIG. 1, a multilayer ceramic electronic component 100 according to the exemplary embodiment may include a ceramic body 110 and external electrodes 131 and 132.

According to the exemplary embodiment, a T-direction shown in FIGS. 1 and 2 refers to a thickness direction of the ceramic body 110, an L-direction shown in FIGS. 1 and 2 refers to a length direction of the ceramic body 110, and a W-direction shown in FIGS. 1 and 2 refers to a width direction of the ceramic body 110.

The thickness (T) direction refers to a stacking direction of internal electrodes and dielectric layers.

Referring to FIGS. 1 and 2, the ceramic body 110 may have upper and lower surfaces opposing each other in the thickness direction, first and second side surfaces opposing each other in the width direction, and third and fourth end surfaces opposing each other in the length direction. A shape of the ceramic body 110 is not particularly limited. For example, the ceramic body 110 may not have a hexahedral shape having completely straight sides/lines, but may have a substantially hexahedral shape.

The ceramic body 110 may include a plurality of dielectric layers 111 and internal electrodes 121 and 122, as shown in FIG. 2.

The ceramic body 110 may include the internal electrodes 121 and 122 formed on the dielectric layers 111. The ceramic body 110 may include an active part, in which a plurality of dielectric layers 111 including the internal electrodes 121, 122 formed thereon are stacked, and a cover part, disposed on upper and lower surfaces of the active part.

Unless particularly described, the upper and lower portions and the upper and lower surfaces are not separately distinguished in the ceramic body, and may be interpreted as having the same meaning as one portion and the other portion in the thickness direction and one surface and the other surface opposing each other in the thickness direction, respectively. In addition, the upper and lower surfaces may be interpreted as having the same meaning as first and second main surfaces of the ceramic body opposing each other in the thickness direction, respectively.

The internal electrodes may include first and second internal electrodes 121 and 122. The first and second internal electrodes 121 and 122 may be alternately disposed on the stacked dielectric layers 111, such that one of the dielectric layers 111 is interposed between adjacent internal electrodes 121 and 122.

Each first internal electrode 121 may be exposed to the third end surface of the ceramic body in the length direction, and each second internal electrode 122 may be exposed to the fourth end surface of the ceramic body in the length direction.

The first and second internal electrodes 121 and 122 may be formed of a conductive paste containing a conductive metal.

The conductive metal may be nickel (Ni), copper (Cu), palladium (Pd), or alloys thereof, but is not limited thereto.

The external electrodes 131 and 132 may respectively be disposed on the third and fourth end surfaces of the ceramic body 110 in the length direction, to thereby respectively be connected to the first internal electrodes 121 and second internal electrodes 122.

The external electrodes 131 and 132 may include the first external electrode 131 and the second external electrode 132, wherein the first external electrode 131 may be connected to the first internal electrode(s) 121, and the second external electrode 132 may be connected to the second internal electrode(s) 122.

The external electrodes 131 and 132 may be formed by applying a conductive paste on the third and fourth end surfaces of the ceramic body 110 in the length direction and then sintering the applied conductive paste. However, a shape of the external electrodes 131 and 132 and a method of forming the external electrodes 131 and 132 are not particularly limited.

The external electrodes 131 and 132 may be disposed on the third and fourth end surfaces of the ceramic body in the length direction, and extended to cover portions of the first and second side surfaces of the ceramic body 110 in the width direction and the upper and lower surfaces of the ceramic body 110 opposing each other in the thickness direction, as shown in FIGS. 1 and 2.

According to the exemplary embodiment, the dielectric layers 111 and the internal electrodes 121 and 122 may be stacked in the thickness (T) direction of the ceramic body as illustrated in FIG. 2.

The cover part may be disposed on an outer surface of an outermost internal electrode of the active part (e.g., above the uppermost internal electrode and below the lowermost internal electrode) in order to protect the active part from external impact.

The cover part may include an upper cover part disposed on the upper surface of the active part (e.g., above the uppermost internal electrode of the active part) and a lower cover part disposed on the lower surface of the active part (e.g., below the lowermost internal electrode of the active part).

Referring to FIG. 2, in the multilayer ceramic electronic component according to the exemplary embodiment, ceramic-metal compound layers 123 may be disposed on interfaces between the internal electrodes 121 and 122 and the dielectric layers 111, respectively. For example, the ceramic-metal compound layers 123 may be disposed on opposing main surfaces of the internal electrodes 121 and 122.

According to the exemplary embodiment, the ceramic-metal compound layer 123 may be formed by printing a ceramic-metal compound formed of ceramic and a metal on a ceramic green sheet, or stacking a green sheet containing the ceramic-metal compound on and below the ceramic green sheet.

A more detailed description thereof will be described below.

According to the exemplary embodiment, the ceramic-metal compound layers 123 may be disposed on the interfaces between the internal electrodes 121 and 122 and the dielectric layers 111, respectively, and thus permittivity of the multilayer ceramic electronic component may be increased due to a space charge effect of the interfaces between the internal electrodes 121 and 122 and the dielectric layers 111.

Further, the ceramic-metal compound layer 123 may prevent cracks in the dielectric layer such as warpage cracks, or the like, from being propagated, thereby improving mechanical properties of the multilayer ceramic electronic component.

Further, insulation resistance (IR) and breakdown voltage (BDV) may be increased due to an energy barrier of interfaces between metal particles and the dielectric layers.

The ceramic-metal compound may be formed by mixing the ceramic and the metal, and may contain between 5 and 30 vol % of the metal.

In a case in which a content of the metal is more than 30 vol %, the metal particles may be connected to each other in the ceramic-metal compound and thereby cause the ceramic-metal compound to exhibit the same electrical properties as those of the metal, thereby causing a problem in reliability.

Fermi energy of the metal mixed with the ceramic may be 4.0 eV to 6.0 eV, but is not limited thereto.

According to the exemplary embodiment, since the Fermi energy of the metal is high (about 4.0 eV to 6.0 eV), a space charge region may be wide, and thus permittivity may be increased due to the space charge effect.

In detail, the metal mixed with the ceramic may be any one or more of Ni, Pd, Pt, Ir, Au, Se, Mo, and W. In a case in which these metals form an interface with barium titanate ($BaTiO_3$), these metals may form a wider space charge region as compared to other metals, thereby obtaining an effect of increasing permittivity.

According to the exemplary embodiment, the metal of the ceramic-metal compound layer 123 may have a particle size of 5 nm to 600 nm.

Since the space charge region is formed in the interfaces between the internal electrodes (e.g., 121, 122) and dielectric layers (e.g., 111), when the ceramic-metal compound is prepared, it is preferable to significantly increase a contact area with the interfaces between the internal electrodes and the dielectric layers as much as possible.

According to the exemplary embodiment, in a case in which the size of the metal particles is more than about 600 nm, a ratio of a surface area to a volume of the particles may be exponentially increased from 1%. Therefore, it is preferable that the size of the metal particles is 600 nm or less.

Meanwhile, in a case in which the size of the metal particles is 5 nm or less, a band gap of the metal may be increased.

Figure 3:
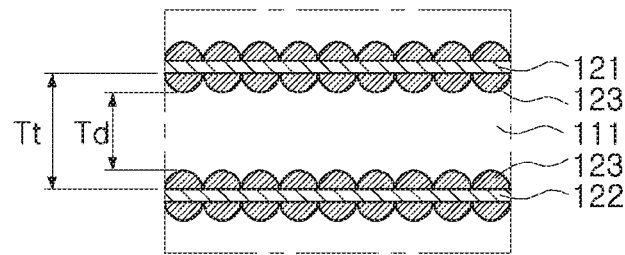
FIG. 3 is an enlarged view of a part P of FIG. 2 according to a first exemplary embodiment.

FIG. 3 is an enlarged view of part P of FIG. 2 according to a first exemplary embodiment.

Referring to FIG. 3, in the multilayer ceramic electronic component according to the first exemplary embodiment, the ceramic-metal compound layer 123 may have an embossing type configuration.

As illustrated in FIG. 3, the embossing type configuration means that the ceramic-metal compound layers 123 are disposed in a form of a plurality of semi-circles in the interfaces between the internal electrodes 121 and 122 and the dielectric layers 111.

The embossing type configuration may appear in a case in which a content (measured in vol %) of the metal in the ceramic-metal compound is increased or a case in which a temperature is slowly raised when the ceramic body 110 is sintered or the ceramic body 110 is sintered at a high temperature for a long period of time.

Figure 4:
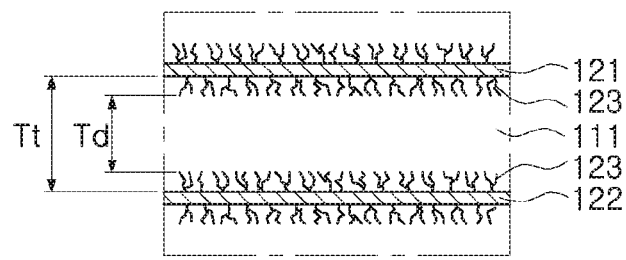
FIG. 4 is an enlarged view of the part P of FIG. 2 according to a second exemplary embodiment.

FIG. 4 is an enlarged view of part P of FIG. 2 according to a second exemplary embodiment.

Referring to FIG. 4, in the multilayer ceramic electronic component according to the second exemplary embodiment, the ceramic-metal compound layer 123 may have a dendrite type configuration.

As illustrated in FIG. 4, the dendrite type configuration means that the ceramic-metal compound layers 123 may extend in a pattern having branches that are entangled with each other in the interfaces between the internal electrodes 121 and 122 and the dielectric layers 111.

The dendrite type configuration may appear in a case in which a content (measured in vol %) of the ceramic in the ceramic-metal compound is increased or a case in which a temperature is rapidly raised when the ceramic body is sintered or the ceramic body is sintered at a high temperature for a short time.

Further, as described below, the ceramic-metal compound layer 123 of the dendrite type configuration may be implemented in situations in which ceramic and oxide additive ingredients are coated on the metal particles contained in the ceramic-metal compound.

The use of a ceramic-metal compound layer 123 of the dendrite type configuration may significantly increase an effective electrode area, thereby increasing capacitance of the multilayer ceramic electronic component.

According to the exemplary embodiment, a ratio (Td/Tt) may satisfy Td/Tt>0.5, where Tt corresponds to a thickness Tt of one of the dielectric layers 111, including a thickness of the ceramic-metal compound layers 123 (e.g., a distance between two adjacent internal electrodes 121 and 122), and Td corresponds to a thickness Td of the portion of the dielectric layer 111 exclusive of the ceramic-metal compound layers 123 (e.g., a distance between the ceramic-metal compound layers 123 of two adjacent internal electrodes 121 and 122).

When Td/Tt satisfies the above-mentioned numerical range, permittivity of the multilayer ceramic electronic component 100 may be increased, and insulation resistance (IR) and breakdown voltage (BDV) may be increased due to the energy barrier of the interfaces between the metal particles and the dielectric layers, as compared to components in which the Td/Tt ratio is not within the above-mentioned numerical range.

In a case in which the ratio (Td/Tt) of the thickness Td of the portion of the dielectric layer 111 exclusive of the ceramic-metal compound layer 123 to the thickness Tt of one of the dielectric layers 111 is 0.5 or less, insulation resistance (IR) and breakdown voltage (BDV) may be decreased.

Figure 5:
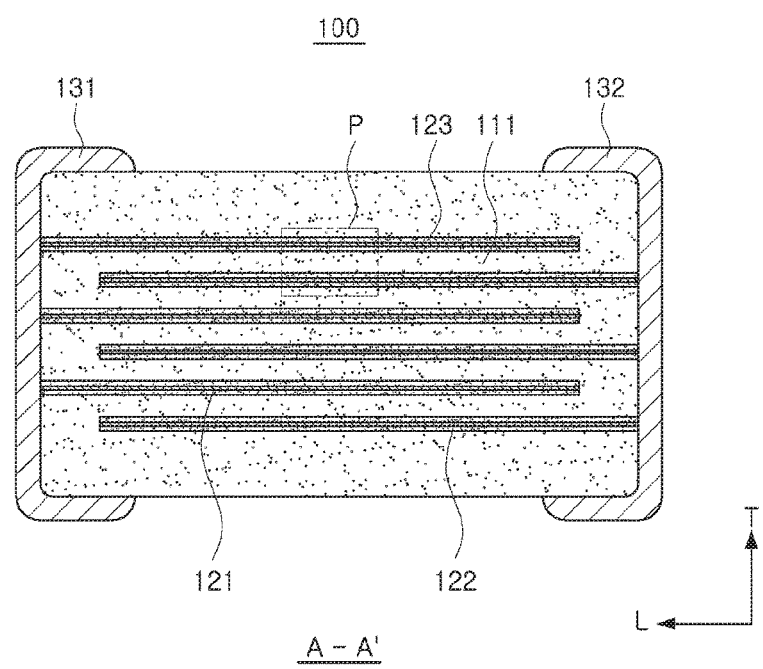
FIG. 5 is a cross-sectional view taken along the line A-A' of FIG. 1 according to another illustrative embodiment.

FIG. 5 is a cross-sectional view taken along the line A-A' of FIG. 1 according to another exemplary embodiment.

According to the exemplary embodiment shown in FIG. 5, a multilayer ceramic electronic component 100 includes a ceramic body 110 in which dielectric layers 111 and internal electrodes 121 and 122 are alternately disposed, wherein the entire dielectric layers 111 contain a ceramic-metal compound containing metal particles. In particular, ceramic-metal compound layers 123 are disposed on interfaces between the internal electrodes 121 and 122 and the dielectric layers 111, respectively, and metal nano-particles 124 are disposed in central portions of the dielectric layers 111 between adjacent ceramic-metal compound layers 123.

Since the multilayer ceramic electronic component 100 according to exemplary embodiment of FIG. 5 has all of the features of the multilayer ceramic electronic component according to the exemplary embodiment of FIG. 1, except that the embodiment of FIG. 5 additionally includes metal nano-particles 124 dispersed and disposed in the central portions of the dielectric layers 111, a detailed description thereof will be omitted in order to avoid an overlapping description.

Figure 6:
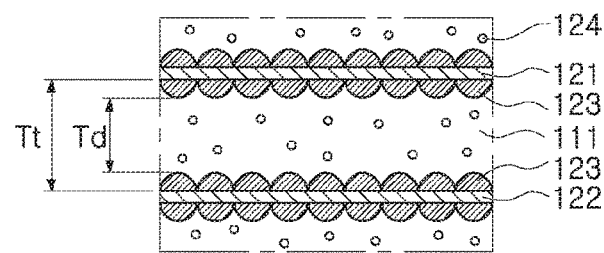
FIG. 6 is an enlarged view of a part P of FIG. 5 according to a third exemplary embodiment.

FIG. 6 is an enlarged view of part P of FIG. 5 according to a third exemplary embodiment.

Figure 7:
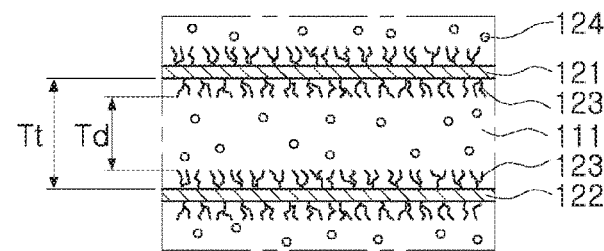
FIG. 7 is an enlarged view of the part P of FIG. 5 according to a fourth exemplary embodiment.

FIG. 7 is an enlarged view of part P of FIG. 5 according to a fourth exemplary embodiment.

Referring to FIGS. 6 and 7, according to the third and fourth exemplary embodiments, the ceramic-metal compound layer 123 may be of an embossing type configuration or a dendrite type configuration respectively, similar to the first and second exemplary embodiments described above in relation to FIGS. 3 and 4, respectively.

Hereinafter, in reference to the multilayer ceramic electronic component according to each of the exemplary embodiments described above, a method of manufacturing or implementing the ceramic-metal compound layer 123 will be described in more detail.

The ceramic-metal compound used in the ceramic-metal compound layer 123 may be prepared by mixing a metal and ceramic capable of significantly increasing the space charge effect.

However, in a case of manufacturing a multilayer ceramic capacitor using the ceramic-metal compound prepared by the mixing as described above, metal particles may become aggregated with each other during the sintering due to a difference in sintering properties between the metal and the ceramic.

In this case, as a result, the ceramic-metal compound layer 123 may be implemented or formed as an embossing type configuration ceramic-metal compound layer, as shown in FIGS. 3 and 6.

The embossing type configuration ceramic-metal compound layer may increase an electrode surface area, and thus insulation resistance (IR) and breakdown voltage (BDV) may be relatively decreased as compared to a dendrite type configuration ceramic-metal compound layer to be described below.

Therefore, in order to significantly increase the area and prevent decreases in insulation resistance (IR) and breakdown voltage (BDV), the dendrite type configuration ceramic-metal compound layer may be more preferable.

The dendrite type configuration ceramic-metal compound layer may be implemented or formed by increasing a content (e.g., measured in vol %) of the ceramic in the ceramic-metal compound, rapidly raising a temperature when the ceramic body is sintered, or sintering the ceramic body at a high temperature for a short time as described above.

Meanwhile, according to the exemplary embodiment, the dendrite type configuration ceramic-metal compound layer may be implemented by coating the ceramic and oxide additive ingredients on the metal particles contained in the ceramic-metal compound.

As described above, the dendrite type configuration ceramic-metal compound layer may significantly increase the electrode area, and thus capacitance of the multilayer ceramic electronic component may be increased, and insulation resistance (IR) and breakdown voltage (BDV) may be relatively increased.

A method of inserting the ceramic-metal compound layers 123 into the interfaces of the internal electrodes 121 and 122 and the dielectric layers 111, respectively, as in the first and second exemplary embodiments may be implemented by a multiple application method or multiple printing method.

That is, the ceramic-metal compound layer 123 may be formed by printing the ceramic-metal compound formed of the ceramic and the metal on the ceramic green sheet, or stacking the green sheet containing the ceramic-metal compound on and below the ceramic green sheet.

In detail, a method of printing the ceramic-metal compound on the ceramic green sheet may be implemented by printing the ceramic-metal compound on the ceramic green sheet, printing an internal electrode thereon, and printing the ceramic-metal compound on the internal electrode to manufacture single units, and then repetitively stacking the single units.

Next, a method of stacking the green sheet containing the ceramic-metal compound on and below the ceramic green sheet may be implemented by stacking the ceramic green sheet on the green sheet containing the ceramic-metal compound, stacking another green sheet containing the ceramic-metal compound thereon, and then printing an internal electrode thereon again to manufacture single units, and then repetitively stacking the single units.

A method of replacing the dielectric layer 111 with the ceramic-metal compound as in the third and fourth exemplary embodiments may be implemented by a multiple application method or a multiple printing method.

That is, the ceramic green sheet may be manufactured using the ceramic-metal compound, and by using the multiple application method or multiple printing method of differently applying a volume content of the metal and a shape of the metal particles in order to implement the ceramic-metal compound layer 123 to be of the embossing type configuration or dendrite type configuration.

Experimental Example

Multilayer ceramic electronic components 100 according to Inventive Examples and Comparative Examples were manufactured as follows.

First, in order to prepare a ceramic-metal compound, the ceramic and the metal were mixed with each other so that 5 to 30 vol % of the metal was contained in the compound.

In Inventive Examples 1 and 3 corresponding to the embossing type configuration, the ceramic-metal compound was prepared so as to contain 30 vol % of the metal.

Meanwhile, in Inventive Examples 2 and 4 corresponding to the dendrite type configuration, the ceramic-metal compound was prepared so as to contain 5 vol % of the metal.

The metal mixed with the ceramic may be any one or more of Ni, Pd, Pt, Ir, Au, Se, Mo, and W, and in the present Inventive Examples, nickel (NI) was used.

Further, the ceramic-metal compound was prepared so that the metal of the ceramic-metal compound had a particle size of 600 nm.

In the present Inventive Examples 1 and 2, a ceramic-metal compound green sheet separate from a ceramic green sheet to be described below was manufactured using the ceramic-metal compound, and in Inventive Examples 3 and 4, a ceramic green sheet was manufactured using the ceramic-metal compound.

Next, slurry containing powder such as barium titanate ($BaTiO_3$) powder, or the like, was applied and dried onto a carrier film to prepare a plurality of ceramic green sheets.

In Inventive Examples 1 and 2, after single units were manufactured by printing the ceramic-metal compound on the ceramic green sheet, printing an internal electrode thereon, and printing the ceramic-metal compound on the internal electrode again, the single units were repetitively stacked.

Alternatively, after single units were manufactured by stacking the ceramic green sheet on the green sheet containing the ceramic-metal compound, stacking the green sheet containing the ceramic-metal compound thereon, and then printing an internal electrode thereon, the single units were repetitively stacked.

In Inventive Examples 3 and 4, an internal electrode pattern was formed by applying a conductive paste for an internal electrode containing nickel on some ceramic green sheets of the ceramic-metal compound green sheets by a screen printing method.

In addition, a ceramic green sheet for forming a cover part, on which the internal electrode pattern is not printed, was prepared. Further, a sheet for forming a buffer layer was prepared by mixing the ceramic slurry and the conductive paste for an internal electrode with each other.

Next, the ceramic green sheet on which the internal electrode pattern was printed and the ceramic green sheet on which the internal electrode pattern was not printed were stacked and isostatically pressed.

A ceramic multilayer body subjected to the isostatic pressing was cut into individual electronic components so that ends of the stacked internal electrode patterns were alternately exposed to cut surfaces, and the cut electronic component was subjected to de-binding.

Thereafter, the cut electronic component was sintered, thereby forming a ceramic body.

After sintering, a size of the ceramic body was about 1.6 mm×0.8 mm×0.8 mm (length×width×thickness (L×W×T), 1608 size, error range: ±0.1 mm).

Inventive Examples 1 and 3 (e.g., as shown in FIGS. 3 and 6, respectively) were implemented by controlling a sintering temperature increasing rate to slowly increase the sintering temperature when sintering was performed, and Inventive Examples 2 and 4 (e.g., as shown in FIGS. 4 and 7, respectively) were implemented by rapidly raising the sintering temperature.

Further, Inventive Examples 1 and 3 were implemented by performing the sintering at a high temperature for a long period of time, and Inventive Examples 2 and 4 were implemented by performing the sintering while relatively decreasing a sintering time.

In the Comparative Example in the present disclosure, a multilayer ceramic capacitor was manufactured by the same method as that in the method of manufacturing a multilayer ceramic capacitor described above except that the ceramic-metal compound was not used as in a general method, and thus, the ceramic-metal compound layer was not formed.

As set forth above, according to the exemplary embodiments, permittivity of the multilayer ceramic electronic component may advantageously be increased based on the space charge effect of the interfaces between the metal and the dielectric layers.

Further, the ceramic-metal compound layer may prevent the propagation of cracks in the dielectric layer such as warpage cracks, or the like, thereby improving the mechanical properties of the multilayer ceramic electronic component.

Further, insulation resistance (IR) and breakdown voltage (BDV) may be improved due to the energy barrier of the interfaces between the metal particles and the dielectric layers.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body in which dielectric layers and internal electrodes are alternately disposed,
wherein ceramic-metal compound layers are disposed on interfaces between the internal electrodes and the dielectric layers, and
wherein a ratio (Td/Tt) satisfies Td/Tt>0.5, wherein Tt corresponds to a distance Tt between two adjacent internal electrodes, including a thickness of the ceramic-metal compound layers, and Td corresponds to a thickness of the portion of the one dielectric layer free of the metal of the ceramic-metal compound layers between the two adjacent internal electrodes.

2. The multilayer ceramic electronic component of claim 1, wherein the ceramic-metal compound layer has an embossing type configuration.

3. The multilayer ceramic electronic component of claim 1, wherein the ceramic-metal compound layer has a dendrite type configuration.

4. The multilayer ceramic electronic component of claim 1, wherein the ceramic-metal compound layer contains 5 to 30 vol % of a metal.

5. The multilayer ceramic electronic component of claim 1, wherein a metal of the ceramic-metal compound layer has a particle size of 5 nm to 600 nm.

6. The multilayer ceramic electronic component of claim 1, wherein a metal of the ceramic-metal compound layer has Fermi energy of 4.0 eV to 6.0 eV.

7. The multilayer ceramic electronic component of claim 1, wherein the ceramic-metal compound layers are disposed as a plurality of semi-circular protrusions in the interfaces between the internal electrodes and the dielectric layers.

8. A multilayer ceramic electronic component comprising:
a ceramic body in which dielectric layers and internal electrodes are alternately disposed, wherein spaces between adjacent internal electrodes are fully occupied by the dielectric layers containing a ceramic-metal compound containing metal particles, and by ceramic-metal compound layers disposed on interfaces between the internal electrodes and the dielectric layers, wherein metal nano-particles are disposed in central portions of the dielectric layers, and wherein the ceramic-metal compound layers are disposed as a plurality of semi-circular protrusions in the interfaces between the internal electrodes and the dielectric layers.

9. The multilayer ceramic electronic component of claim 8, wherein the ceramic-metal compound contains 5 to 30 vol % of a metal.

10. The multilayer ceramic electronic component of claim 8, wherein a metal of the ceramic-metal compound has a particle size of 5 nm to 600 nm.

11. The multilayer ceramic electronic component of claim 8, wherein a ratio (Td/Tt) satisfies Td/Tt>0.5, wherein Tt corresponds to a thickness Tt of one of the dielectric layers including a thickness of the ceramic-metal compound layers and Td corresponds to a thickness Td of the portion of the one dielectric layer exclusive of the ceramic-metal compound layers.

12. The multilayer ceramic electronic component of claim 8, wherein a metal of the ceramic-metal compound has Fermi energy of 4.0 eV to 6.0 eV.

13. A multilayer ceramic electronic component comprising:

a plurality of internal electrodes disposed parallel to each other and spaced apart from each other within the multilayer ceramic electronic component, wherein the internal electrodes each have ceramic-metal compound layers disposed on two opposing surfaces thereof, and wherein ceramic and oxide additive ingredients are coated on metal particles contained in the ceramic-metal compound of the ceramic-metal compound layers.

14. The multilayer ceramic electronic component of claim 13, further comprising:

dielectric layers disposed between pairs of adjacent internal electrodes of the plurality of internal electrodes; and two external electrodes disposed on respective opposing end surfaces of a ceramic body including the dielectric layers and the internal electrodes.

15. The multilayer ceramic electronic component of claim 14, wherein the dielectric layers disposed between the pairs of adjacent internal electrodes include a ceramic-metal compound containing metal particles.

16. The multilayer ceramic electronic component of claim 15, wherein spaces between the pairs of adjacent internal electrodes are exclusively filled with the dielectric layers including the ceramic-metal compound containing metal particles and with the ceramic-metal compound layers disposed on surfaces of the internal electrodes.

17. The multilayer ceramic electronic component of claim 16, wherein the ceramic-metal compound layers have an embossing type configuration.

18. The multilayer ceramic electronic component of claim 16, wherein the ceramic-metal compound layers have a dendrite type configuration.

19. The multilayer ceramic electronic component of claim 13, wherein the ceramic-metal compound layer contains 5 to 30 vol % of a metal.

20. The multilayer ceramic electronic component of claim 13, wherein the ceramic-metal compound layers are disposed as a plurality of semi-circular protrusions on the two opposing surfaces of the internal electrodes.

* * * * *